(12) United States Patent
Ting

(10) Patent No.: US 7,727,023 B2
(45) Date of Patent: Jun. 1, 2010

(54) ELECTRICAL CARD CONNECTOR

(75) Inventor: Chien-Jen Ting, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/322,117

(22) Filed: Jan. 28, 2009

(65) Prior Publication Data

US 2009/0191761 A1  Jul. 30, 2009

(30) Foreign Application Priority Data

Jan. 28, 2008  (TW) .............................. 97103041 A

(51) Int. Cl.
*H01R 24/00* (2006.01)
(52) U.S. Cl. ...................................... 439/630; 439/159
(58) Field of Classification Search ................. 439/630, 439/627, 159, 607.31, 607.33; 235/441
See application file for complete search history.

(56) References Cited

U.S. PATENT DOCUMENTS 6,290,136 B1 * 9/2001 Koseki et al. ............... 235/475

6,814,597 B1 * 11/2004 Kao ........................... 439/159
2008/0123320 A1  5/2008 Cheng

* cited by examiner

*Primary Examiner*—Javaid Nasri
(74) *Attorney, Agent, or Firm*—Andrew C. Cheng; Wei Te Chung; Ming Chieh Chang

(57) ABSTRACT

An electrical card connector (100) includes an insulating housing (30), a metal shield (10) shielding over the insulating housing for defining a card receiving space, a plurality of contacts (32) received in the insulating housing and a base (20) assembled at a side of the metal shield. The insulating housing has a body portion (31) and first and second assembling boards (301, 302) formed at two ends of the body portion. The first assembling board defines a first retaining hole (35) and the second assembling board defines a second retaining hole (37). The base includes a guiding portion (21), an extending portion (22) at a front part of the guiding portion and a protruding portion (23) bending laterally from a distal end of the extending portion. The metal shield forms a first fastening element (15) received in the first retaining hole. A second fastening element (27) is retained by the protruding portion and is received in the second retaining hole.

16 Claims, 4 Drawing Sheets

ELECTRICAL CARD CONNECTOR

BACKGROUND OF THE INVENTION

1. Field of the Invention

The present invention relates generally to electrical card connectors, and more particularly to an L-shaped Express Card connector having an ejector.

2. Description of Related Arts

With the development of the technologies, the standard cards are highly needed to be improved in many aspects, such as transmitting capacity and transmitting speed. Therefore, an Express card is defined by the Personal Computer Memory Card International Association (PCMCIA) and an Express Card connector for receiving the Express card and transferring information between the Express card and a circuit board occurs timely. The Express Card connector has two types in configuration, one is rectangular and another is L-shaped. Generally, the L-shaped Express Card connector forms an ejector for ejecting the card out of the connector and a base for receiving the ejector. A pair of fastening portions, usually screws in most embodiments, is formed on a metal shell of the connector and screwed into the holes defined on the insulating housing which is assembled on a front part of the metal shell. Indeed, in assembly, the base with the ejector is assembled onto a side of the metal shell prior to the assembling of the metal shell onto the insulating housing, and because both the fastening portions are formed on the metal shell, the base is baffled by an adjacent fastening portion possibly. Furthermore, the fastening portions provide retaining force only between the metal shell and the insulating housing. No retaining force provided between the base and the insulating housing causes a bad ejection effect of the ejector.

Hence, an improved electrical card connector is desired.

SUMMARY OF THE INVENTION

Accordingly, an object of the present invention is to provide an electrical card connector, parts of which are simply and smoothly assembled.

To achieve the above object, an electrical card connector includes an insulating housing, a metal shield shielding over the insulating housing for defining a card receiving space, a plurality of contacts received in the insulating housing and a base assembled at a side of the metal shield. The insulating housing forms a body portion and first and second assembling boards formed at two ends of the body portion. The first assembling board defines a first retaining hole and the second assembling board defines a second retaining hole. The base includes a guiding portion, an extending portion at a front part of the guiding portion and a protruding portion bending laterally from a distal end of the extending portion. The metal shield forms a first fastening element received in the first retaining hole and a second fastening element retained by the protruding portion is received in the second retaining hole.

Other objects, advantages and novel features of the invention will become more apparent from the following detailed description when taken in conjunction with the accompanying drawings.

DETAILED DESCRIPTION OF THE PREFERRED EMBODIMENT

Figure 1:
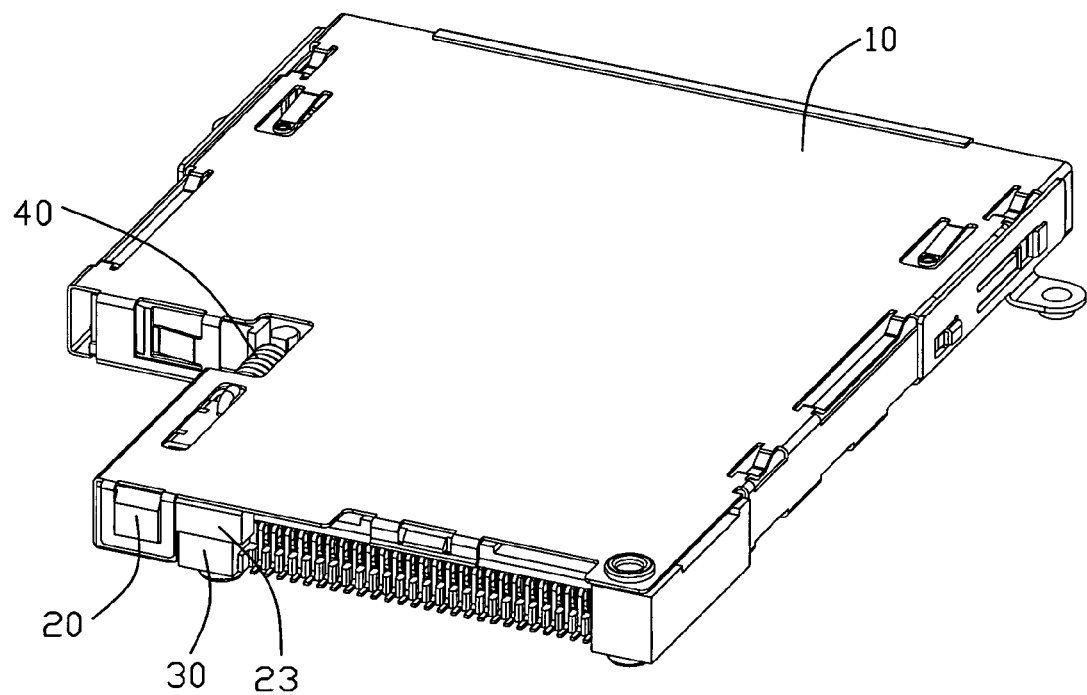
FIG. 1 is a perspective, assembled view of an electrical card connector according to the present invention.

FIGS. 1-4 illustrate an electrical card connector 100 in accordance with the present invention, assembled on a printed circuit board (PCB) (not shown) and comprising an insulating housing 30, a plurality of contacts 32 received in the insulating housing 30, a metal shield 10 shielding over the insulating housing 30 for defining a card receiving space (not labeled), a base 20 assembled at a side of the metal shield 10 and an ejector 40 received in the base 20.

Figure 2:
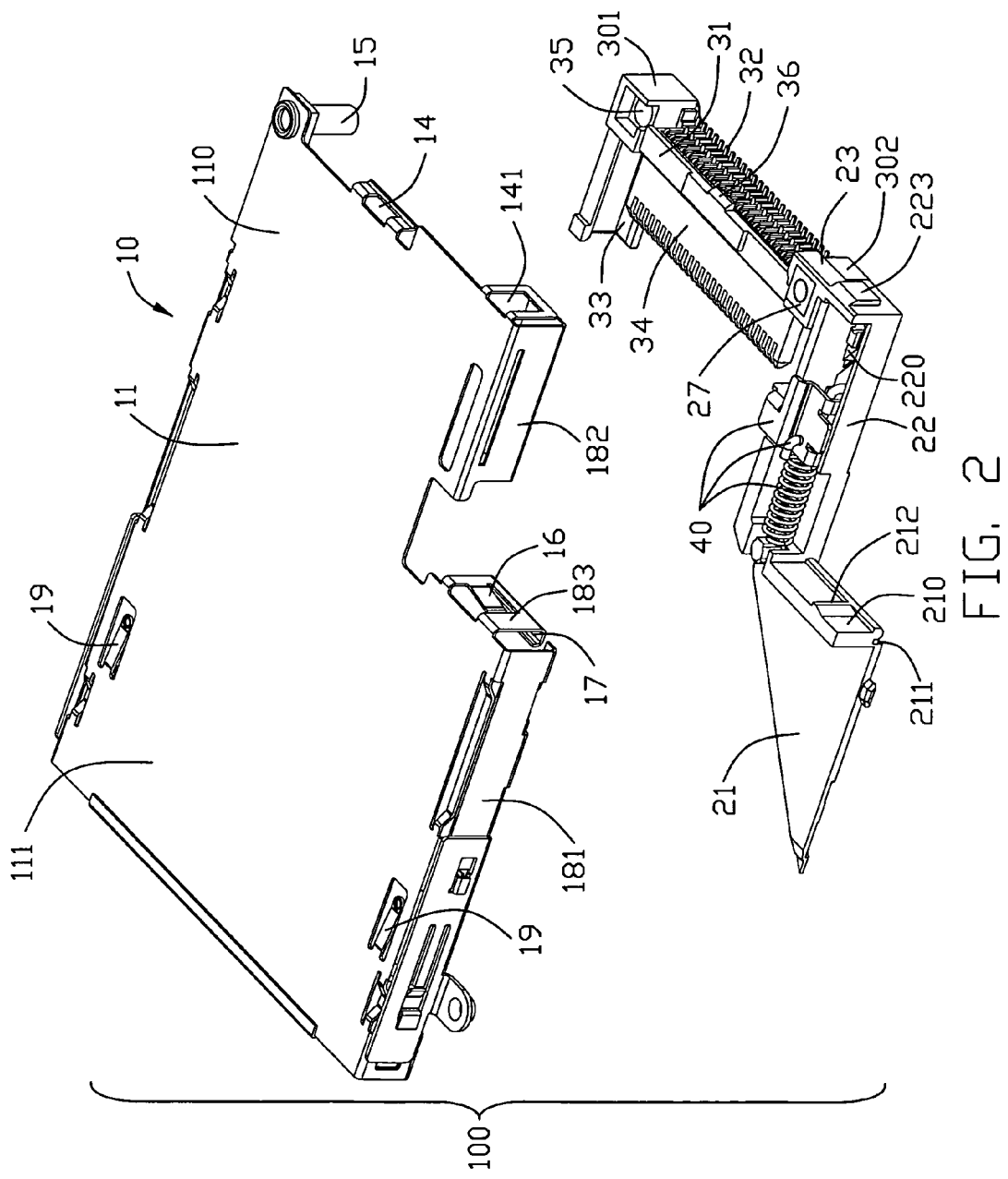
FIG. 2 is a perspective, exploded view of the electrical card connector.

Referring to FIG. 2, the metal shield 10 is generally L-shaped and comprises a flat portion 11 and a plurality of lateral walls (not labeled) extending from edges of the flat portion 11. The flat portion 11 defines a rear portion 111 and a front portion 110 with width narrower than the rear portion 111. The lateral walls comprise a first longitudinal wall 181 extending from an edge of the rear portion 111, a second longitudinal wall 182 extending from an edge of the front portion 110 and a transverse wall 183 extending along a cross direction relative to the first and second longitudinal walls 181, 182. The transverse wall 183 forms an elastic piece 16 extending into the card receiving space and a fastening portion 17 extending rearward and upward from a bottom edge thereof. The front portion 110 forms a first fastening element 15 at a side apart from the second longitudinal wall 182. The front portion 110 defines an opening 14 at a front side of the middle thereof and an aperture 141 at a front side adjacent to the second longitudinal wall 182. A plurality of resilient pieces 19 are formed on the rear portion 111 for ensuring close electrical connection between an electrical card and the contacts 32.

Figure 3:
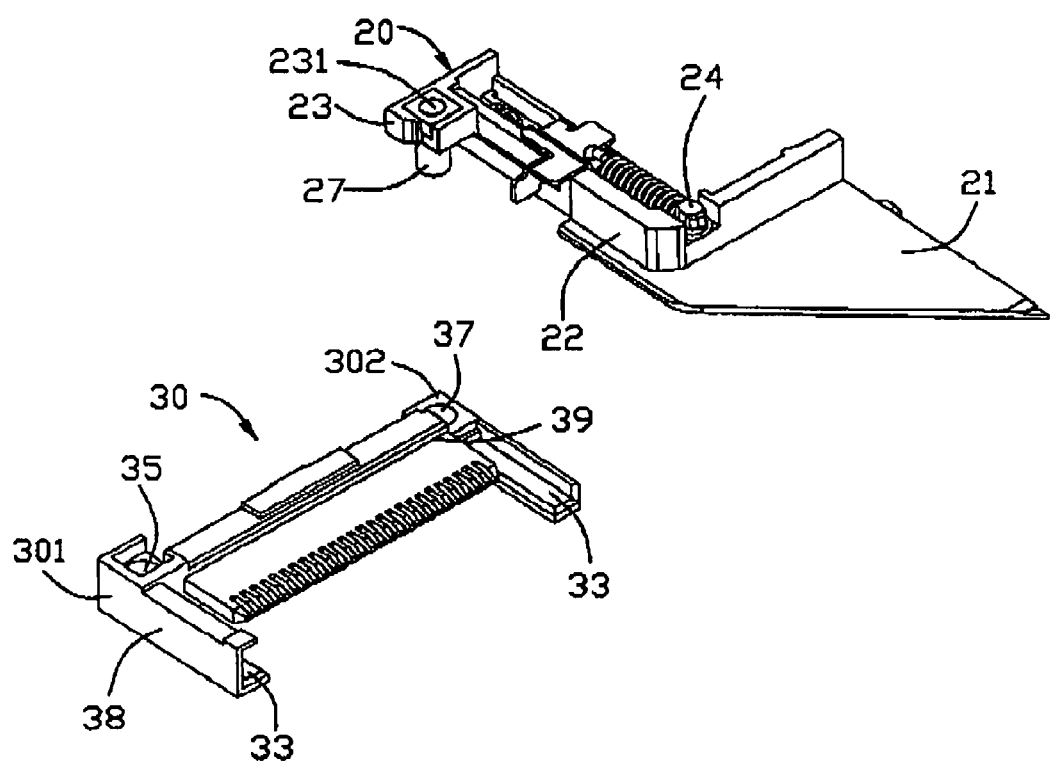
FIG. 3 is a perspective view of the base and the insulating housing of the electrical card connector.
Figure 4:
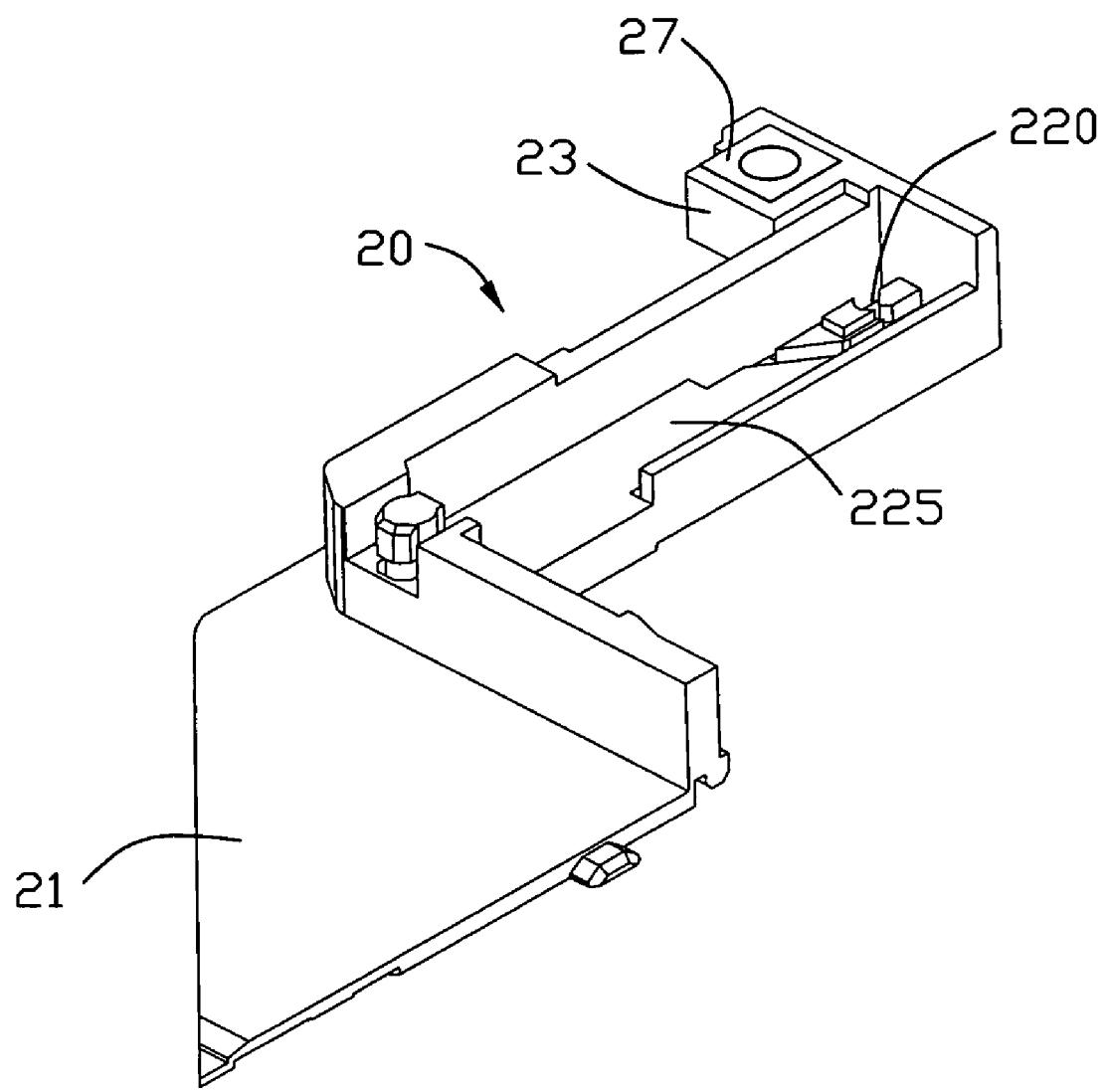
FIG. 4 is another perspective view of the base of the present invention.

Referring to FIGS. 2-3, the insulating housing 30 extending along a transverse direction perpendicular to a card insertion/ejection direction, comprises a body portion 31, a first assembling board 301 and a second assembling board 302 unitarily formed at two ends of the body portion 31, a pair of shoulders (not labeled) extending respectively and backwardly from the assembling boards 301, 302. The body portion 31 forms a bulge 36 in the middle thereof for mating with the opening 14 of the metal shield 10. The first assembling board 301 defines a first retaining hole 35 for receiving the first fastening element 15. The second assembling board 302 defines a second retaining hole 37. The first assembling board 301 and the second assembling board 302 have respective upper surfaces in different levels. The upper surface of the first assembling board 301 is higher than the upper surface of the body portion 31 and the upper surface of the second assembling board 302 is lower than the upper surface of the body portion 31. A mating portion 34 also extends backwardly from the body portion 31 and is sandwiched between the pair of shoulders and forms a flat gradient together with the body portion 31. The shoulders define two guiding channels 33 both exposed towards the mating portion 34. A plurality of terminal receiving passageways (not labeled) recess in the mating portion 34 and receive the aligned contacts 32. The contacts 32 form contacting portions (not labeled) extending into the card receiving space to mate with the inserted electrical card electrically and soldering portions (not labeled) soldering with the PCB.

The base 20 unitarily forms a guiding portion 21, an extending portion 22 at a front part of the guiding portion 21 and a protruding portion 23 bending laterally from a distal end of the extending portion 22. Taking a horizontal view, the protruding portion 23 and the guiding portion 21 are placed at different sides of the extending portion 22. The guiding portion 21 is approximately triangle-shaped for distinguishing a rectangular electrical card and an L-shaped electrical card. The guiding portion 21 forms an erect wall 210 perpendicular to the extending portion 22. The erect wall 210 forms a rib 212 forwardly for interfering with the elastic piece 16 and defines a slit 211 at a bottom surface thereof for receiving the fastening portion 17. The extending portion 22 defines a lengthwise channel 225 for receiving the ejector 40 and a heart-shaped slot 220 at a front part of the lengthwise channel 225 for circularly movement of the ejector 40. The extending portion 22 forms a protrusion 223 for mating with the aperture 141 of the metal shield 10. The protruding portion 23 defines a third retaining hole (not labeled) with a second fastening element 27 assembled therein.

In assembly, the base 20 with the second fastening element 27 installed in the third retaining hole is firstly assembled at a side of the metal shield 10 and is steadily retained therein by virtue of the rib 212, the slit 211 and the protrusion 223, which respectively and correspondingly mate with the elastic piece 16, the fastening portion 17 and the aperture 141. The metal shield 10 together with the base 20 is then assembled onto the insulating housing 30, while the first fastening element 15 is received in the first retaining hole 35 and the second fastening element 27 is received in the second retaining hole 37. Taking a perspective, assembled view of the electrical card connector 100 shown as FIG. 1, the protruding portion 23 is seated above the second assembling board 302 to achieve an approximate altitude as the first assembling board 301.

In the present invention, for the second fastening element 27 is installed on the base 20 instead of forming on the metal shield 10 as the first fastening element 15, a problem in the prior art that the base is baffled by something such as the adjacent fastening portion is avoided. The base 20 is assembled at a side of the metal shield 10 without difficulty. Furthermore, the second fastening element 27 is retained in both the third retaining hole of the base 30 and the second retaining hole 37 of the insulating housing 30, in other words, the base 20 is screwed onto the insulating housing 30 to achieve stabilization and accordingly, the inserted electrical card is smoothly ejected out of the electrical card connector 100 because of the ejector 40.

The second fastening element 27 is molded separately, and is assembled on the base 20 in the above embodiment, however, the second fastening element 27 unitarily molded with the base 20 is an alternative embodiment.

While a preferred embodiment in accordance with the present invention has been shown and described, equivalent modifications and changes known to persons skilled in the art according to the spirit of the present invention are considered within the scope of the present invention as described in the appended claims.

I claim:

1. An electrical card connector comprising:
    an insulating housing having a body portion and first and second assembling boards formed at two ends of the body portion, the first assembling board defining a first retaining hole and the second assembling board defining a second retaining hole;
    a metal shield shielding over the insulating housing for defining a card receiving space, the metal shield forming a first fastening element received in the first retaining hole;
    a plurality of contacts received in the insulating housing; and
    a base assembled at a side of the metal shield and comprising a guiding portion, an extending portion at a front part of the guiding portion and a protruding portion bending laterally from a distal end of the extending portion; wherein
    a second fastening element is retained by the protruding portion and is received in the second retaining hole.

2. The electrical card connector as described in claim 1, wherein the first assembling board and the second assembling board have respective upper surfaces at different levels.

3. The electrical card connector as described in claim 2, wherein the body portion defines an upper surface, and the upper surface of the first assembling board is higher than the upper surface of the body portion and the upper surface of the second assembling board is lower than the upper surface of the body portion.

4. The electrical card connector as described in claim 3, wherein the protruding portion is seated above the second assembling board at a level approximately same as the first assembling board.

5. The electrical card connector as described in claim 4, wherein the protruding portion defines a third retaining hole and the second fastening element is assembled in the third retaining hole.

6. The electrical card connector as described in claim 4, wherein the fastening element is unitarily formed on the protruding portion.

7. The electrical card connector as described in claim 1, wherein a pair of shoulders extend backwardly from the first and second assembling boards.

8. The electrical card connector as described in claim 7, wherein the shoulders define two guiding channels.

9. The electrical card connector as described in claim 7, wherein a mating portion extends backwardly from the body portion and is sandwiched between the pair of shoulders, respectively.

10. The electrical card connector as described in claim 9, wherein the mating portion forms a flat gradient together with the body portion.

11. The electrical card connector as described in claim 1, wherein the protruding portion and the guiding portion are placed at different sides of the extending portion.

12. The electrical card connector as described in claim 11, wherein the guiding portion comprises an erect wall which forms a rib interfering with an elastic piece defined on the metal shield.

13. The electrical card connector as described in claim 12, wherein the erect wall defines a slit receiving a fastening portion of the metal shield at a bottom surface thereof.

14. The electrical card connector as described in claim 11, wherein the extending portion defines a lengthwise channel and an ejector is received in the lengthwise channel.

15. The electrical card connector as described in claim 14, wherein the extending portion forms a protrusion for mating with an aperture defined on the metal shield.

16. An electrical connector comprising:
    an insulative housing;
    a plurality of contacts disposed in the housing;
    an insulative base located beside the housing in a transverse direction, said base defining an oblique guiding portion and an extending portion located intimately adjacent to the housing and extending along a front-to-back direction perpendicular to said transverse direction;

an ejection mechanism disposed upon the extending portion; and a metallic shell defining an L-shaped configuration in a top view and respectively assembled with the housing and the base; wherein the housing and the extending portion are secured to each other; wherein said housing and said extending portion are secured to other via an external discrete part; wherein said external discrete part extends through both said housing and said extending portion in a vertical direction; wherein said housing and said extending portion are overlapped with each other in said vertical direction.

* * * * *